(12) United States Patent
Shin (10) Patent No.: US 11,866,091 B1
(45) Date of Patent: Jan. 9, 2024

(54) STEERING COLUMN FOR VEHICLE

(71) Applicant: HL MANDO CORPORATION, Gyeonggi-do (KR)

(72) Inventor: Donghun Shin, Seoul (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 17/986,872

(22) Filed: Nov. 14, 2022

(30) Foreign Application Priority Data

Nov. 16, 2021 (KR) .......................... 10-2021-0157316

(51) Int. Cl.
*B62D 1/185* (2006.01)
*B62D 3/06* (2006.01)

(52) U.S. Cl.
CPC ............... *B62D 1/185* (2013.01); *B62D 3/06* (2013.01)

(58) Field of Classification Search
CPC ................................... B62D 1/185; B62D 3/06
See application file for complete search history.

(56) References Cited

FOREIGN PATENT DOCUMENTS

| CN | 110015337 A | * | 7/2019 | ............. B62D 1/181 |
| CN | 112550426 A | * | 3/2021 | ............. B62D 1/183 |
| CN | 111232046 B | * | 12/2022 | ............. B62D 1/11 |
| DE | 102017218894 A1 | * | 4/2019 | ............. B62D 1/181 |
| DE | 102018122767 A1 | * | 3/2020 | ............. B62D 1/181 |
| DE | 102019209114 A1 | * | 12/2020 | |
| KR | 10-2021-0108014 | | 9/2021 | |
| WO | WO-2021224199 A1 | * | 11/2021 | ............. B62D 1/185 |

* cited by examiner

*Primary Examiner* — Drew J Brown
(74) *Attorney, Agent, or Firm* — Ladas & Parry, LLP (57) ABSTRACT

A steering column for vehicle according to an embodiment of the present disclosure includes an upper column, a lower column, a pinion pulley, a guide roller, a telemotor, and a belt. A steering shaft is disposed in the upper column, and the rack bar is disposed on an outer surface of the upper column. The upper column is disposed in the lower column. The lower column includes an opening portion in which the rack bar is disposed, a first protruding portion formed at one side of an outer peripheral surface, and a second protruding portion formed at the other side of the outer peripheral surface. The pinion pulley is rotatably coupled to the first protruding portion, and the guide roller is rotatably coupled to the second protruding portion. The telemotor is fixedly coupled to an outer surface of the lower column. The belt connects the pinion pulley and the telemotor.

11 Claims, 11 Drawing Sheets

STEERING COLUMN FOR VEHICLE

CROSS-REFERENCE TO RELATED APPLICATIONS

This application claims benefit and priority to Korean Patent Application No. 10-2021-0157316, filed on Nov. 16, 2021, with the Korean Intellectual Property Office, the disclosure of which is incorporated herein in its entirety by reference.

TECHNICAL FIELD

The present disclosure relates to a steering column for vehicle, and more particularly, to a steering column for vehicle, in which a telemotor does not move, and a controller for adjusting speed of the telemotor is not required.

BACKGROUND ART

A current steering column for a vehicle includes a telescopic function and a tilting function. A driver may adjust a degree to which a steering wheel protrudes and an inclination angle of the steering wheel suitable for the driver's height or body type by using the functions, such that the driver may smoothly perform a steering operation.

Recently, a vehicle has been developed which enables autonomous driving that allows the vehicle to autonomously reach the destination without requiring the driver to manipulate the steering wheel, an accelerator pedal, and a brake. Further, there is a need to ensure a larger space to provide convenience for the driver during autonomous driving.

To this end, an attempt has been made to increase a teles-in stroke length of a steering shaft 15 and vary speed for each section (telescopic section) of the stroke length.

The steering column in the related art including the telescopic function and the tilting function has a problem in that a space occupied by the steering column in the vehicle increases because of an increase in length of a lead screw. Further, there is a problem in that a separate controller for controlling a telescopic drive motor (hereinafter, referred to as a 'telemotor') needs to be provided to vary the speed for each of the telescopic sections. Further, there is a problem in that the size, weight, and noise of the telemotor are increased to increase operating speed during telescopic operation (particularly, in a stow mode).

[Document of Related Art]
[Patent Document]
Korean Patent Application Laid-Open No. 10-2021-0108014 (published on Sep. 2, 2021)

SUMMARY

The present disclosure has been made in an effort to provide a steering column for a vehicle, which is capable of varying speed for each telescopic section without using a lead screw and a controller for adjusting speed of a telemotor.

However, the object to be achieved by the present disclosure is not limited to the above-mentioned objects but may be variously expanded without departing from the spirit and scope of the present disclosure.

To achieve the objects of the present disclosure, exemplary embodiments of the present disclosure provide a steering column for a vehicle that may vary the speed for each telescopic section by applying a variable gear ratio without using a controller for adjusting speed of the telemotor and improve a degree of arrangement freedom of the telemotor by adjusting the length of the belt.

A steering column for a vehicle according to an embodiment of the present disclosure includes an upper column, a lower column, a pinion pulley, a guide roller, a telemotor, and a belt. A steering shaft is disposed in the upper column, and the rack bar is disposed on an outer surface of the upper column. The upper column is disposed in the lower column. The lower column includes an opening portion in which the rack bar is disposed, a first protruding portion formed at one side of an outer peripheral surface, and a second protruding portion formed at the other side of the outer peripheral surface. The pinion pulley is rotatably coupled to the first protruding portion, and the guide roller is rotatably coupled to the second protruding portion. The telemotor is fixedly coupled to an outer surface of the lower column. The belt connects the pinion pulley and the telemotor.

According to an embodiment, the rack bar may have a variable gear formed in a longitudinal direction on one side surface thereof. The variable gear may have a low gear section, a high gear section, and a variable section between the low gear section and the high gear section.

According to an embodiment, the opening portion may be formed in a direction orthogonal to a through-hole formed in a longitudinal direction of the lower column, and the opening portion may be formed in a body of the lower column in the longitudinal direction and have a predetermined length.

According to an embodiment, the upper column may rectilinearly move in the longitudinal direction of the lower column in a state in which the upper column is disposed in the through-hole formed in the lower column, and the rack bar coupled to the upper column may rectilinearly move in the longitudinal direction of the lower column in a state in which the rack bar is disposed in the opening portion.

According to an embodiment, the lower column may include one side of an outer peripheral surface and the other side of the outer peripheral surface based on the opening portion. The telemotor and the pinion pulley may be disposed at one side of the outer peripheral surface of the lower column, and the guide roller may be disposed at the other side of the outer peripheral surface of the lower column.

According to an embodiment, a pulley gear and a pinion gear may be formed on a lateral surface of the pinion pulley. The rack bar may have a variable gear formed on one side surface thereof in a longitudinal direction. The belt may be fastened to the pulley gear, and the pinion gear may be in contact with the variable gear.

According to an embodiment, when the pinion pulley rotates in one direction, the upper column rectilinearly may move in a first direction, and when the pinion pulley rotates in a direction opposite to the one direction, the upper column rectilinearly may move in a direction opposite to the first direction.

According to an embodiment, when a rotary shaft of the telemotor is rotated by an operation of the telemotor, the pinion pulley may be rotated by the belt.

According to an embodiment, the belt may connect a rotary shaft of the telemotor and a pulley gear of the pinion pulley.

According to an embodiment, a lateral surface of the guide roller may be in contact with the other side surface of the rack bar.

According to an embodiment, the guide roller may be disposed to face the pinion pulley based on an opening portion of the lower column or the rack bar.

The steering column for a vehicle according to an embodiment of the present disclosure does not use a lead screw, thereby increasing a space for providing convenience for the driver.

Further, it is possible to vary the speed for each telescopic section without using a controller for adjusting the speed of the telemotor, thereby ensuring a larger space for providing convenience for the driver. Further, it is possible to reduce manufacturing costs by reducing the number of components.

In addition, it is possible to reduce the size, weight, and noise of the telemotor.

Furthermore, it is possible to increase a degree of freedom of the telemotor by freely changing the position of the telemotor.

However, the effect of the present disclosure is not limited to the above- mentioned effects but may be variously expanded without departing from the spirit and scope of the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments of the present disclosure will be described in more detail with reference to the accompanying drawings. The specific description of constituent elements of the present disclosure which can be easily reproduced and clearly understand, from the related art, by those skilled in the art will be omitted in order not to obscure the subject matter of the present disclosure.

The position on/above or under/below the layer will be described based on the drawings. A thickness or a size of each layer in the drawings is exaggerated, omitted, or schematically illustrated for the purpose of clarity and for convenience of description. In addition, the size of each constituent element does not entirely reflect its actual size.

Hereinafter, a steering column for a vehicle according to an embodiment of the present disclosure will be described.

Figure 1:
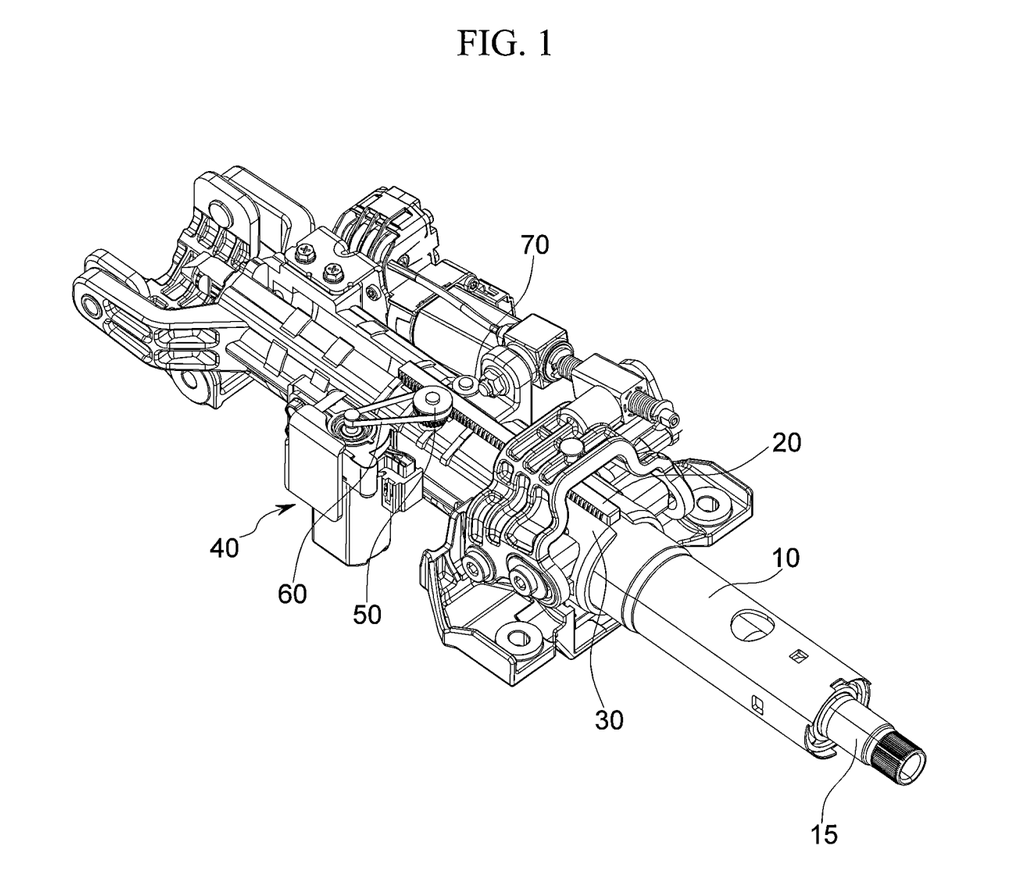
FIG. 1 is a view illustrating a steering column for a vehicle according to an embodiment of the present disclosure.
Figure 2:
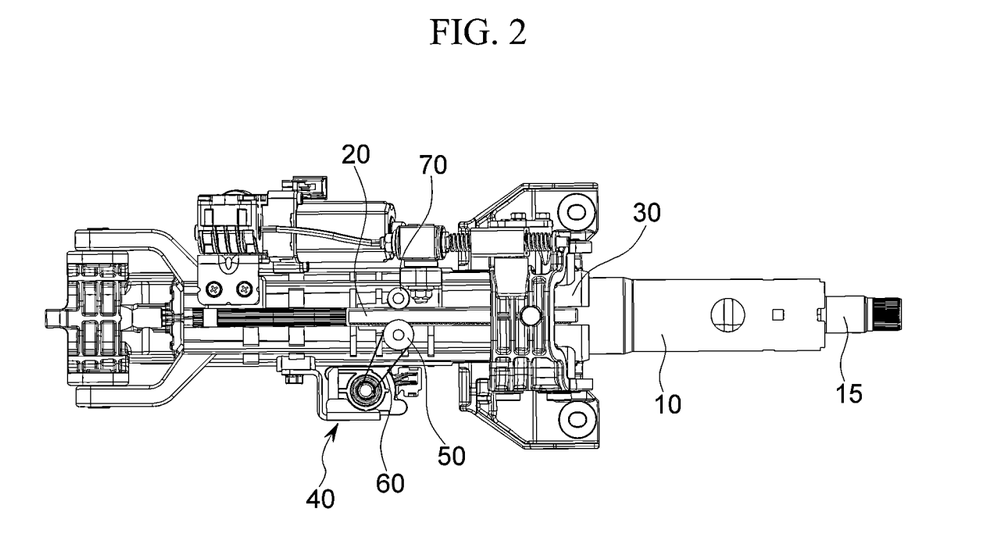
FIG. 2 is a top plan view of the steering column for a vehicle in FIG. 1.
Figure 3:
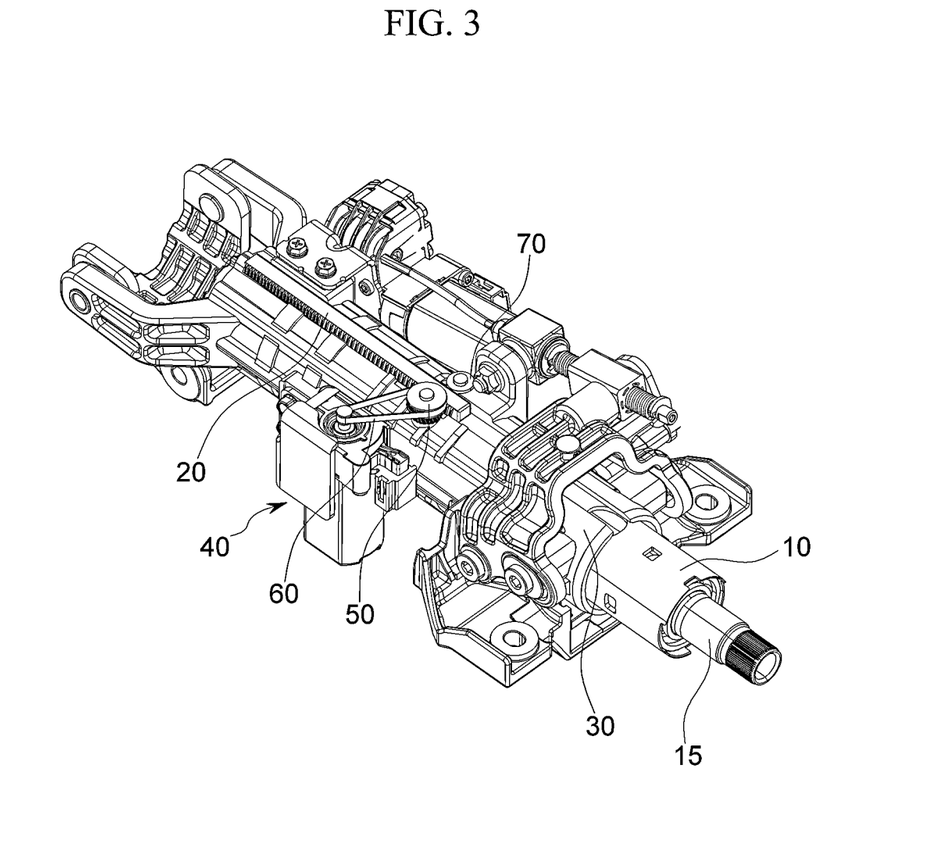
FIG. 3 is a view illustrating a state (teles-in) in which an upper column in FIG. 1 is retracted into a lower column.

FIG. 1 is a view illustrating a steering column for a vehicle according to an embodiment of the present disclosure, FIG. 2 is a top plan view of the steering column for a vehicle in FIG. 1, and FIG. 3 is a view illustrating a state (teles-in) in which an upper column in FIG. 1 is retracted into a lower column.

Referring to FIGS. 1 to 3, a steering column for a vehicle according to an embodiment of the present disclosure includes an upper column 10, a rack bar 20, a lower column 30, a telemotor 40, a pinion pulley 50, a belt 60, and a guide roller 70.

A steering shaft 15 is disposed in the upper column 10, and the rack bar 20 is disposed on an outer surface of the upper column 10. The upper column 10 is disposed in the lower column 30. The lower column 30 includes: an opening portion 32 (see FIG. 7) in which the rack bar 20 is disposed; a first protruding portion 36 (see FIG. 7) formed at one side 34 of an outer peripheral surface; and a second protruding portion 35 (see FIG. 7) formed at the other side 33 of the outer peripheral surface. The pinion pulley 50 is 10 rotatably coupled to the first protruding portion 36, and the guide roller 70 is rotatably coupled to the second protruding portion 35. The telemotor 40 is fixedly coupled to an outer surface of the lower column 30. The belt 60 connects the pinion pulley 50 and the telemotor 40. Hereinafter, the constituent elements will be specifically described.

Figure 4:
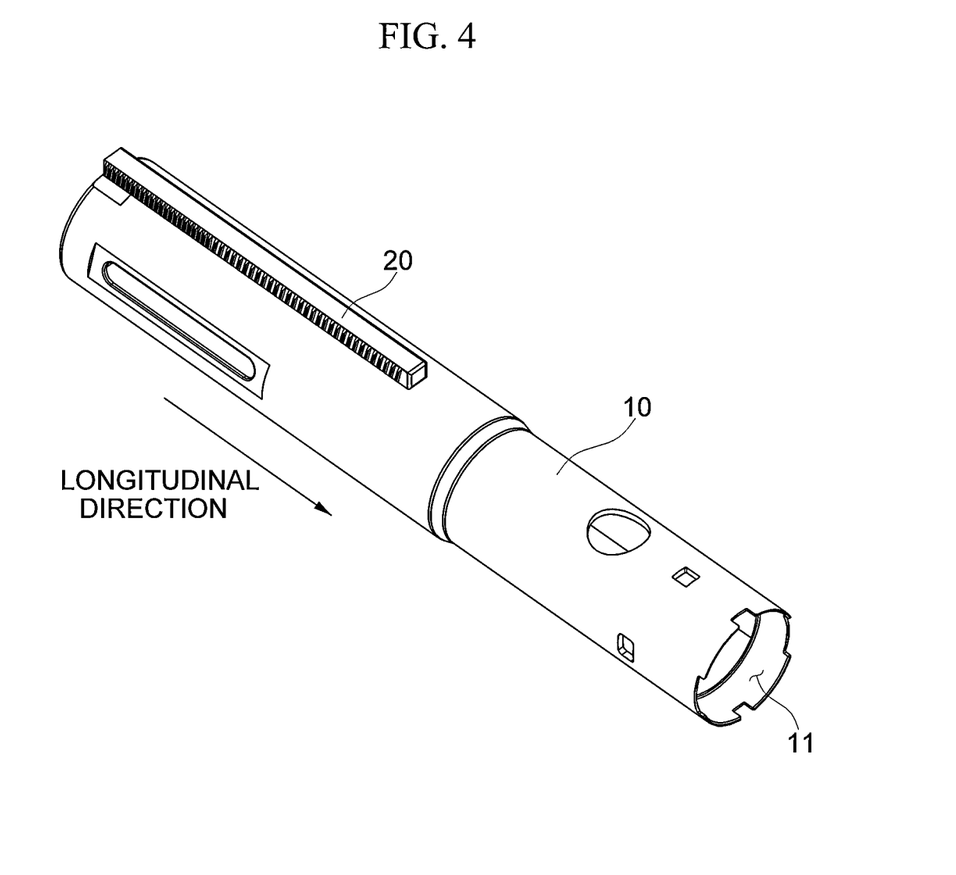
FIG. 4 is a view illustrating the upper column and a rack bar in FIG. 1.
Figure 5:
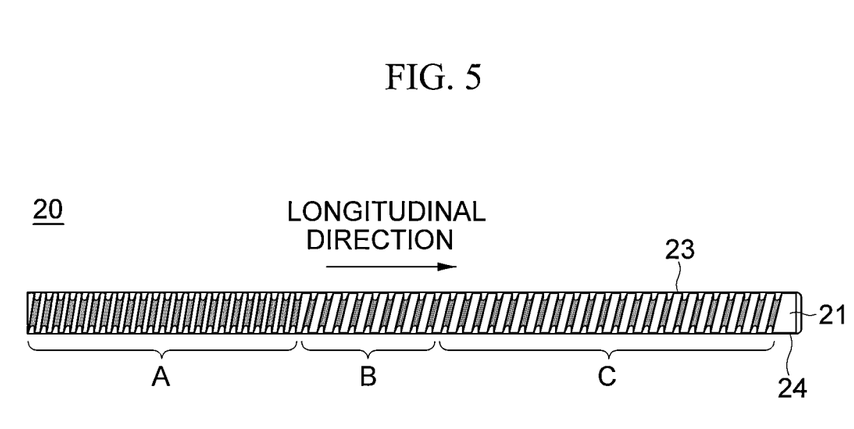
FIG. 5 is a view illustrating a variable gear ratio of the rack bar in FIG. 4.
Figure 6:
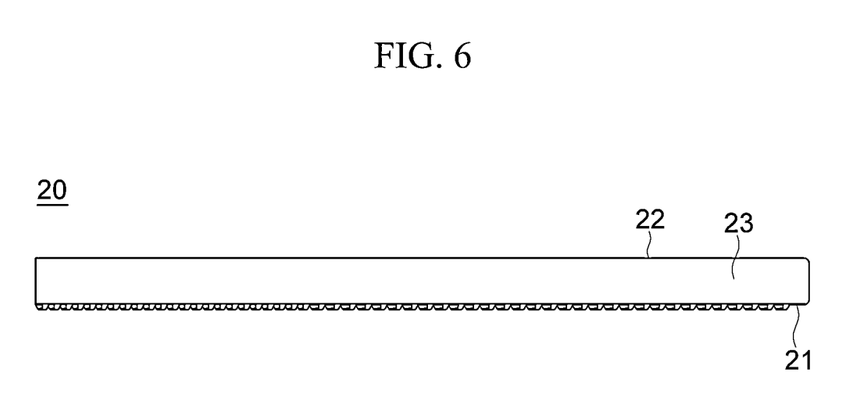
FIG. 6 is a top plan view of the rack bar in FIG. 4.

FIG. 4 is a view illustrating the upper column and a rack bar in FIG. 1, FIG. 5 is a view illustrating a variable gear ratio of the rack bar in FIG. 4, and FIG. 6 is a top plan view of the rack bar in FIG. 4.

Referring to FIGS. 1 to 6, the steering shaft 15 is disposed in the upper column 10, and the rack bar 20 is disposed on the outer surface of the upper column 10.

The upper column 10 has a cylindrical tubular shape having a predetermined length, and the steering shaft 15 is disposed in the upper column 10. A steering wheel (not illustrated) is coupled to the one end of the steering shaft 15, and the other end of the steering shaft 15 is connected to a steering mechanism (a connection mechanism related to steering).

The upper column 10 is disposed in the lower column 30.

The rack bar 20 is disposed on the outer peripheral surface of the upper column 10.

The upper column 10 and the rack bar 20 may be integrated or separately manufactured and then coupled to each other. The upper column 10 and the rack bar 20 may be coupled by welding or in various ways such as bolt-fastening and coupling using a bonding agent.

In FIG. 4, reference numeral 11 indicates a through-hole formed through the upper column 10 in a longitudinal direction of the upper column 10. The steering shaft is disposed in the through-hole.

The rack bar 20 may be formed in a rod shape having a predetermined length.

The rack bar 20 includes one side surface 21 having a predetermined length, the other side surface 22, and upper and lower surfaces 23 and 24 configured to connect the one side surface 21 and the other side surface 22. In this case, the one side surface 21 and the other side surface 22 are surfaces opposite to each other, and the upper surface 23 and the lower surface 24 are surfaces opposite to each other.

The rack bar 20 is fixedly coupled to the outer peripheral surface of the upper column 10. Specifically, the lower surface 24 of the rack bar 20 is fixedly coupled to the outer peripheral surface of the upper column 10. Therefore, when the rack bar 20 moves, the upper column 10 also moves together with the rack bar 20.

A gear is formed on one side surface 21 of the rack bar 20 in the longitudinal direction of the rack bar 20. The gear formed on the one side surface 21 of the rack bar 20 is defined as a 'variable gear'.

A variable gear ratio is applied to the variable gear.

Specifically, the variable gear may be formed to have a low gear section A, a high gear section B, and a variable section B between the low gear section A and the high gear section B.

The variable gear is in contact with the pinion pulley 50. When the pinion pulley 50 rotates, the rack bar 20 rectilinearly moves. That is, when the pinion pulley 50 rotates in one direction, the rack bar 20 rectilinearly moves in a first direction. When the pinion pulley 50 rotates in a direction opposite to the one direction, the rack bar 20 rectilinearly moves in a direction opposite to the first direction. In this case, the one direction is the rotation direction, and the first direction is the rectilinear movement direction (hereinafter, the same applies).

When the pinion pulley 50 rotates in one direction in a state in which the pinion pulley 50 is in contact with the low gear section A of the variable gear, the rack bar 20 rectilinearly moves in the first direction at a predetermined low speed. When the pinion pulley 50 rotates in one direction in a state in which the pinion pulley 50 passing through the low gear section A of the variable gear is in contact with the variable section B, the rack bar 20 rectilinearly moves in the first direction while the speed changes from a low speed to a high speed. Further, when the pinion pulley 50 rotates in one direction in a state in which the pinion pulley 50 passing through the variable section B of the variable gear is in contact with a high-speed gear section C, the rack bar 20 rectilinearly moves in the first direction at a predetermined high speed. When the pinion pulley 50 rotates in the direction opposite to the one direction, the rack bar 20 rectilinearly moves in the direction opposite to the first direction. The variable section B serves as a buffer that prevents the speed of the rack bar from rapidly changing from the low speed to the high speed or from the high speed to the low speed.

The other side surface of the rack bar 20 is in contact with the guide roller 70.

Figure 7:
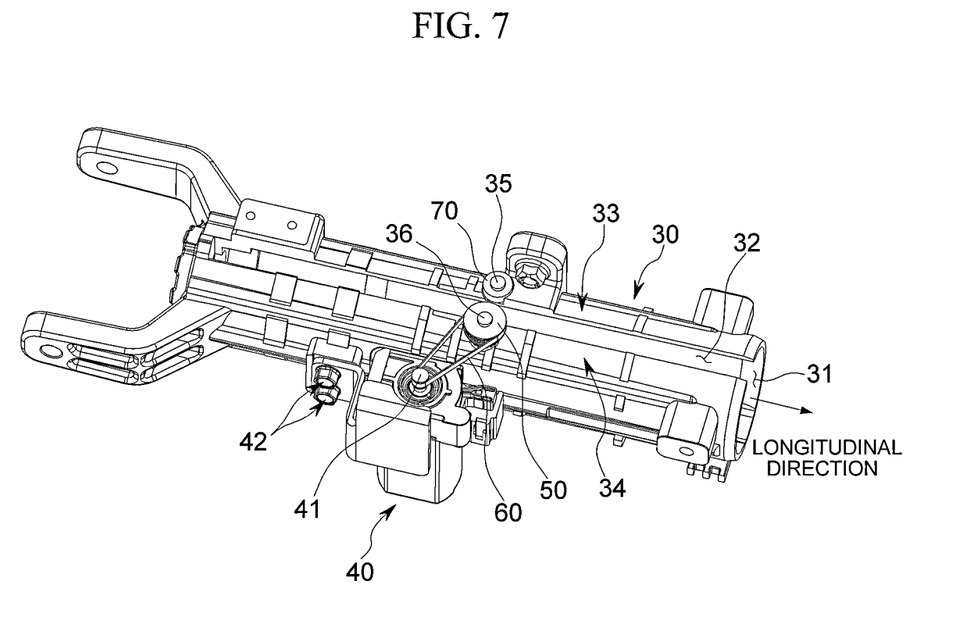
FIG. 7 is a view illustrating the lower column in FIG. 1 and a telemotor, a belt, a pinion pulley, and a guide roller mounted on the lower column.
Figure 8:
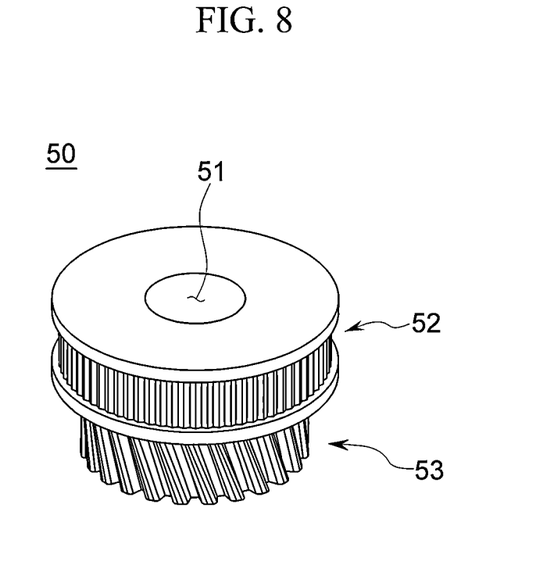
FIG. 8 is a view illustrating the pinion pulley in FIG. 7.
Figure 9:
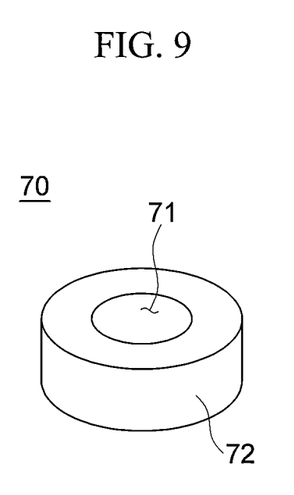
FIG. 9 is a view illustrating the belt in FIG. 7.
Figure 10:
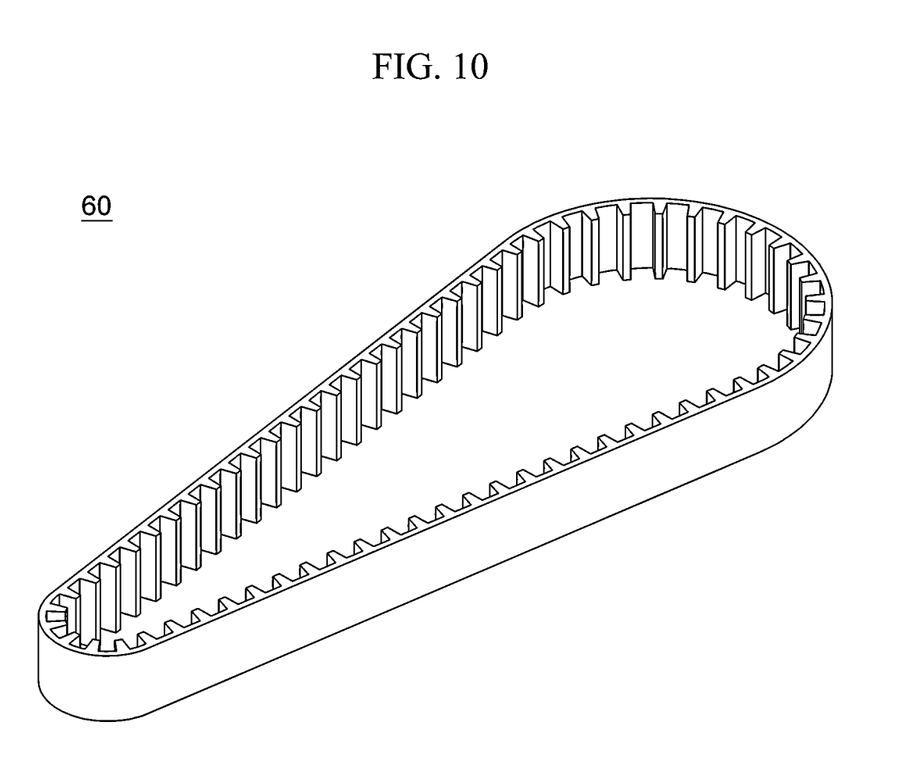
FIG. 10 is a view illustrating the guide roller in FIG. 7.

FIG. 7 is a view illustrating the lower column in FIG. 1 and the telemotor, the belt, the pinion pulley, and the guide roller mounted on the lower column, FIG. 8 is a view illustrating the pinion pulley in FIG. 7, FIG. 9 is a view illustrating the belt in FIG. 7, and FIG. 10 is a view illustrating the guide roller in FIG. 7.

Referring to FIGS. 1 and 7 to 10, the lower column 30 has a cylindrical tubular shape having a predetermined length, and the upper column 10 is disposed in the lower column 30. The cylindrical tubular shape may be referred to as a body of the lower column 30.

The upper column 10 may rectilinearly move in the longitudinal direction of the lower column 30 (the body of the lower column 30) in the state in which the upper column 10 is disposed in the lower column 30 (specifically, the body of the lower column 30).

In FIG. 7, reference numeral 31 indicates the through-hole formed through the lower column 30 formed in the longitudinal direction of the lower column 30 (the body of the lower column 30). The upper column 10 may rectilinearly move in the longitudinal direction of the lower column 30 in the state in which the upper column 10 is disposed in the through-hole 31.

The lower column 30 has the opening portion 32 formed through the body of the lower column 30.

The opening portion 32 is a hole formed in the direction orthogonal to the through-hole 31 formed in the longitudinal direction of the lower column 30. The opening portion 32 is formed through the body of the lower column 30.

The opening portion 32 is formed in the body in the longitudinal direction of the lower column 30 and has a predetermined length.

The upper column 10 is disposed in the lower column 30 (the body of the lower column 30). The rack bar 20 coupled to the upper column 10 is disposed in the opening portion 32 of the lower column 30 (the body of the lower column 30) and exposed to the outside.

The upper column 10 may rectilinearly move in the longitudinal direction of the lower column 30 in the state in which the upper column 10 is disposed in the through-hole 31 formed in the lower column 30 (the body of the lower column 30). The rack bar 20 coupled to the upper column 10 may rectilinearly move in the longitudinal direction of the lower column 30 in the state in which the rack bar 20 is disposed in the opening portion 32.

The lower column 30 (specifically, the body of the lower column 30) may include one side 34 of the outer peripheral surface and the other side 33 of the outer peripheral surface of the lower column 30 based on the opening portion 32. That is, the one side 34 of the outer peripheral surface and the other side 33 of the outer peripheral surface of the lower column 30 are opposite to each other based on the opening portion 32.

The telemotor 40 and the pinion pulley 50 are disposed at one side 34 of the outer peripheral surface of the lower column 30 (specifically, the body of the lower column 30). The guide roller 70 is disposed at the other side 33 of the outer peripheral surface of the lower column 30 (specifically, the body of the lower column 30).

The single protruding portion (the first protruding portion) 36 is formed at one side 34 of the outer peripheral surface of the lower column 30 so that the pinion pulley 50 may be coupled to the protruding portion and rotate.

The first protruding portion 36 may be formed at a position adjacent to the opening portion 32 and extend or protrude upward from the outer peripheral surface of the lower column 30.

The first protruding portion 36 serves as a rotation center axis of the pinion pulley 50 when the pinion pulley 50 is coupled to the first protruding portion 36 and rotates.

Further, the single protruding portion (the second protruding portion) 35 is formed at the other side 33 of the outer peripheral surface of the lower column 30 so that the guide roller 70 may be coupled to the protruding portion and rotate.

The second protruding portion 35 may be formed at a position adjacent to the opening portion 32 and extend or protrude upward from the outer peripheral surface of the lower column 30.

The second protruding portion 35 serves as a rotation center axis of the guide roller 70 when the guide roller 70 is coupled to the second protruding portion 35 and rotates.

The telemotor 40 is fixedly coupled to the outer surface of the lower column 30.

The telemotor 40 is a drive motor for rectilinearly moving the upper column 10 in the longitudinal direction of the upper column 10 (or the lower column 30).

The telemotor 40 has a rotary shaft 41 and is coupled and fixed to one side 34 of the outer peripheral surface of the lower column 30 by a fastening means such as a coupling screw 42.

The telemotor 40 is disposed to be spaced apart from the pinion pulley 50 at a predetermined distance.

Because the telemotor 40 is a typical component, a detailed description of the drive motor is omitted.

The pinion pulley 50 has a cylindrical shape and a through-hole 51 formed at a middle portion thereof. Specifically, the pinion pulley 50 has a cylindrical shape. When an upper surface of the cylindrical shape is defined as an upper surface, a lower surface of the cylindrical shape is defined as a lower surface, and a surface connecting the upper surface and the lower surface is defined as a lateral surface, the through-hole 51 is disposed in the middle portion of the pinion pulley 50 and formed through the upper and lower surfaces. In addition, a pulley gear 52 and a pinion gear 53 are formed on the lateral surface of the pinion pulley 50.

The pulley gear 52 may be formed on an upper portion of the lateral surface of the pinion pulley 50, and the pinion gear 53 may be formed on a lower portion of the lateral surface of the pinion pulley 50 (see FIG. 8).

The pinion pulley 50 is disposed at one side 34 of the outer peripheral surface of the lower column 30. Specifically, the pinion pulley 50 is rotatably coupled to the protruding portion (the first protruding portion) 36 formed at one side 34 of the outer peripheral surface of the lower column 30.

The protruding portion (the first protruding portion) 36 formed at one side 34 of the outer peripheral surface of the lower column 30 is inserted into the through-hole 51 of the pinion pulley 50. The pinion pulley 50 may rotate about the first protruding portion 36 as a central axis.

The belt 60 is fastened to the pulley gear 52.

The belt 60 connects the rotary shaft 41 of the telemotor 40 and the pulley gear 52 of the pinion pulley 50. One side of the belt 60 is fastened to the rotary shaft 41 of the telemotor 40, and the other side of the belt 60 is fastened to the pulley gear 52 of the pinion pulley 50.

When the rotary shaft 41 of the telemotor 40 is rotated by an operation of the telemotor 40, the belt 60 rotates, and the pulley gear 52 rotates. That is, when the rotary shaft 41 of the telemotor 40 is rotated by the operation of the telemotor 40, the pinion pulley 50 rotates.

The pinion gear 53 is in contact with the rack bar 20. Specifically, the pinion gear 53 is in contact (engages) with the variable gear formed at one side surface 21 of the rack bar 20. The pinion gear 53 rotates together with the pulley gear 52 when the pulley gear 52 rotates.

When the pinion pulley 50 is rotated by the operation of the telemotor 40, the rack bar 20, which is in contact with the pinion gear 53 of the pinion pulley 50, rectilinearly moves in the opening portion 32 of the lower column 30.

Specifically, when the rotary shaft 41 of the telemotor 40 is rotated in one direction by the operation of the telemotor 40, the pinion pulley 50 rotates in one direction, and the rack bar 20 rectilinearly moves in the first direction in the opening portion 32 of the lower column 30. Further, when the rotary shaft 41 of the telemotor 40 rotates in the direction opposite to the one direction, the pinion pulley 50 rotates in the direction opposite to the one direction, and the rack bar 20 rectilinearly moves in the direction opposite to the first direction in the opening portion 32 of the lower column 30.

When the pinion gear 53 of the pinion pulley 50 rotates in one direction in the state in which the pinion gear 53 of the pinion pulley 50 is in contact (engages) with the low gear section A of the variable gear of the rack bar 20, the rack bar 20 rectilinearly moves in the first direction at a predetermined low speed. When the pinion gear 53 rotates in one direction in the state in which the pinion gear 53 passing through the low gear section A of the variable gear is in contact (engages) with the variable section B, the rack bar 20 rectilinearly moves in the first direction while the speed changes from the low speed to the high speed. Further, when the pinion gear 53 rotates in one direction in the state in which the pinion gear 53 passing through the variable section B of the variable gear is in contact (engages) with the high-speed gear section C, the rack bar 20 rectilinearly moves in the first direction at a predetermined high speed. When the pinion gear 53 rotates in the direction opposite to the one direction, the rack bar 20 rectilinearly moves in the direction opposite to the first direction.

Therefore, when the pinion pulley 50 rotates in one direction, the upper column 10 coupled to the rack bar 20 rectilinearly moves in the first direction. When the pinion pulley 50 rotates in the direction opposite to the one direction, the upper column 10 rectilinearly moves in the direction opposite to the first direction.

The belt 60 connects the pinion pulley 50 and the telemotor 40.

The belt 60 connects the rotary shaft 41 of the telemotor 40 and the pulley gear 52 of the pinion pulley 50. One side of the belt 60 is fastened to the rotary shaft 41 of the telemotor 40, and the other side of the belt 60 is fastened to the pulley gear 52 of the pinion pulley 50.

The belt 60 transmits power of the telemotor 40 to the pinion pulley 50.

When the rotary shaft 41 of the telemotor 40 is rotated by the operation of the telemotor 40, the belt 60 rotates, and the pulley gear 52 rotates. That is, when the rotary shaft 41 of the telemotor 40 is rotated by the operation of the telemotor 40, the pinion pulley 50 is rotated by the belt 60.

The telemotor 40 may be disposed at (fixed to) one side 34 of the outer peripheral surface of the lower column 30. The arrangement position of the telemotor 40 may be freely moved (changed) by adjusting the length of the belt 60.

The material of the belt 60 may be a material typically used in the belt 60.

The guide roller 70 has a cylindrical shape and a through-hole 71 formed at a middle portion thereof. Specifically, the guide roller 70 has a cylindrical shape. When the surface connecting the upper surface and the lower surface of the cylindrical shape is defined as lateral surface, a through-hole 71 is disposed in the middle portion of the guide roller 70 and formed through the upper and lower surfaces.

The guide roller 70 is disposed at the other side 33 of the outer peripheral surface of the lower column 30. Specifically, the guide roller 70 is rotatably coupled to the protruding portion (the second protruding portion) 35 formed at the other side 33 of the outer peripheral surface of the lower column 30.

The protruding portion (the second protruding portion) 35 formed at the other side 33 of the outer peripheral surface of the lower column 30 is inserted into the through-hole 71 of the guide roller 70. The guide roller 70 may rotate about the second protruding portion 35 as a central axis.

A lateral surface 72 of the guide roller 70 is in contact with the other side surface of the rack bar 20.

When the rack bar 20 rectilinearly moves, the guide roller 70 guides the movement of the rack bar 20 and supports the rack bar 20.

Specifically, when the rack bar 20 rectilinearly moves in the opening portion 32 of the lower column 30, the guide roller 70 guides the rectilinear movement of the rack bar 20 and supports the rack bar 20 and the upper column 10 so that the rack bar 20 and the upper column 10 do not sway.

The guide roller 70 may be disposed to face the pinion pulley 50 based on the rack bar 20 or the opening portion 32 of the lower column 30. This arrangement may stably guide the rectilinear movement of the rack bar 20 and the upper column 10 and prevent the occurrence of vibration.

The steering column for a vehicle according to the embodiment of the present disclosure has a telescopic function and a tilting function. The telescopic function of the steering column for a vehicle according to the embodiment of the present disclosure has been described above.

The lower column 30 is coupled to a mounting bracket fixed to a vehicle body. The upper column 10 is inserted into the through-hole 31 of the lower column 30 and configured to be slidable in the longitudinal direction of the upper column 10. The upper column 10 is slid by the operation of the telemotor 40, and the steering wheel (not illustrated) connected to one end of the steering shaft 15 is extended or retracted (the telescopic operation is performed). For reference, FIG. 1 illustrates a state in which the upper column 10 is extended from the lower column 30 (teles-out), and FIG. 3 illustrates a state in which the upper column 10 is retracted into the lower column 30 (teles-in).

When the rotary shaft 41 of the telemotor 40 is rotated in one direction by the operation of the telemotor 40, the pinion pulley 50 rotates in one direction, and the rack bar 20 and the upper column 10 rectilinearly move in the first direction in the through-hole 31 and the opening portion 32 of the lower column 30. Further, when the rotary shaft 41 of the telemotor 40 rotates in the direction opposite to the one direction, the pinion pulley 50 rotates in the direction opposite to the one direction, and the rack bar 20 and the upper column 10 rectilinearly move in the direction opposite to the first direction in the through-hole 31 and the opening portion 32 of the lower column 30.

Therefore, the steering shaft 15 disposed in the upper column 10 rectilinearly moves in the first direction or rectilinearly moves in the direction opposite to the first direction. In this case, the first direction may be a direction in which the steering shaft 15 moves toward the driver, and the direction opposite to the first direction may be a direction in which the steering shaft 15 moves away from the driver (the telescopic operation is performed).

Hereinafter, the tilting function of the steering column for a vehicle according to the embodiment of the present disclosure will be briefly described.

Figure 11:
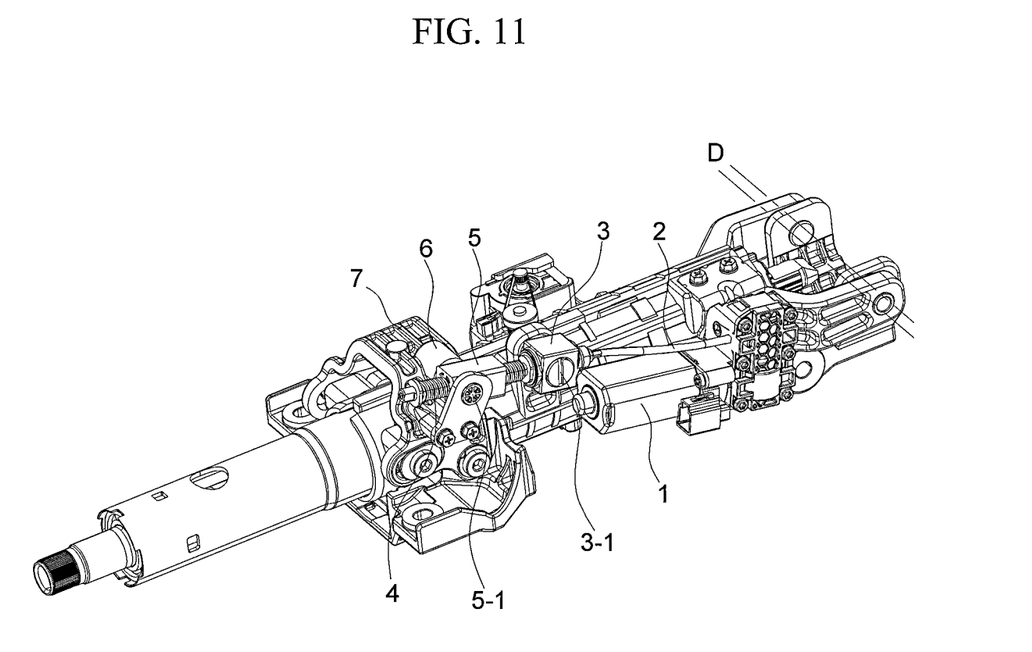
FIG. 11 is a view for explaining a tilting motion of the steering column for a vehicle in FIG. 1.

FIG. 11 is a view for explaining a tilting motion of the steering column for a vehicle in FIG. 1.

Referring to FIGS. 1 and 11, when a rotary shaft of a tilt motor 1 is rotated in one direction by an operation of the tilt motor 1, a flexible shaft 2 rotates in one direction, and a tilt screw 4, which is connected to the flexible shaft 2 by means of a hinge nut 3, rotates in one direction. In this case, the tilt nut 5 rectilinearly moves in the first direction along the tilt screw 4.

A rotary shaft 5-1 of the tilt nut 5 is connected to the linkage bracket 6, and a rotary shaft of the linkage bracket 6 is connected to a tilt bracket 7. The tilt bracket 7 is coupled to the lower column 30.

When the tilt nut 5 rectilinearly moves in the first direction along the tilt screw 4, the hinge nut 3 rotates about a central axis 3-1 of the hinge nut 3, the tilt nut 5 rotates about the rotary shaft 5-1 of the tilt nut 5, the linkage bracket 6 rotates about a rotary shaft of the linkage bracket 6, and the tilt bracket 7 rotates about a rotary shaft (bolt) of the tilt bracket 7, such that the lower column 30 tilts, for example, tilts upward, about a tilt axis D as a central axis. When the rotary shaft of the tilt motor 1 rotates in the direction opposite to the one direction, the lower column 30 tilts downward about the tilt axis D as a central axis.

The steering column for a vehicle according to the embodiment of the present disclosure does not use a lead screw, thereby increasing a space for providing convenience for the driver.

Further, it is possible to vary the speed for each telescopic section without using a controller for adjusting a speed of the telemotor 40, thereby ensuring a larger space for providing convenience for the driver. Further, it is possible to reduce manufacturing costs by reducing the number of components.

In addition, it is possible to reduce the size, weight, and noise of the telemotor 40.

Furthermore, it is possible to improve a degree of freedom of the telemotor 40 by freely changing the position of the telemotor 40 by adjusting the length of the belt 60.

The features, structures, effects, and the like described above in the exemplary embodiments are included in at least one exemplary embodiment of the present disclosure, but the present disclosure is not necessarily limited to one exemplary embodiment. Further, the features, structures, effects, and the like described in the respective embodiments may be combined or modified and then carried out by those skilled in the art as other embodiments. It should be interpreted that the combination and modification are included in the scope of the present disclosure.

Further, the embodiments have been described above, but the embodiments are just illustrative and not intended to limit the present disclosure. It can be appreciated by those skilled in the art that various modifications and alterations, which are not described above, may be made without departing from the intrinsic features of the present disclosure. That is, the respective constituent elements specifically described in the exemplary embodiments may be modified and then carried out. Further, it should be interpreted that the differences related to the modifications and alterations are included in the scope of the present disclosure defined by the appended claims.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present disclosure, as well as various alternatives and modifications thereof. As is evident from the foregoing description, certain aspects of the present disclosure are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A steering column for vehicle, the steering column comprising:
   an upper column having an outer surface on which a rack bar is disposed, the upper column being configured such that a steering shaft is disposed in the upper column;
   a lower column configured such that the upper column is disposed in the lower column, the lower column including an opening portion in which the rack bar is disposed, a first protruding portion formed at one side of an outer peripheral surface, and a second protruding portion formed at the other side of the outer peripheral surface;
   a pinion pulley rotatably coupled to the first protruding portion;
   a guide roller rotatably coupled to the second protruding portion;
   a telemotor fixedly coupled to an outer surface of the lower column; and
   a belt configured to connect the pinion pulley and the telemotor.

2. The steering column of claim 1, wherein the rack bar has a variable gear formed in a longitudinal direction on one side surface thereof, and the variable gear has a low gear section, a high gear section, and a variable section between the low gear section and the high gear section.

3. The steering column of claim 1, wherein the opening portion is formed in a direction orthogonal to a through-hole formed in a longitudinal direction of the lower column, and the opening portion is formed in a body of the lower column in the longitudinal direction and has a predetermined length.

4. The steering column of claim 3, wherein the upper column rectilinearly moves in the longitudinal direction of the lower column in a state in which the upper column is disposed in the through-hole formed in the lower column, and
   wherein the rack bar coupled to the upper column rectilinearly moves in the longitudinal direction of the lower column in a state in which the rack bar is disposed in the opening portion.

5. The steering column of claim 1, wherein the lower column includes one side of an outer peripheral surface and the other side of the outer peripheral surface based on the opening portion, and
   wherein the telemotor and the pinion pulley are disposed at one side of the outer peripheral surface of the lower column, and the guide roller is disposed at the other side of the outer peripheral surface of the lower column.

6. The steering column of claim 1, wherein a pulley gear and a pinion gear are formed on a lateral surface of the pinion pulley, the rack bar has a variable gear formed on one side surface thereof in a longitudinal direction, the belt is fastened to the pulley gear, and the pinion gear is in contact with the variable gear.

7. The steering column of claim 1, wherein when the pinion pulley rotates in one direction, the upper column rectilinearly moves in a first direction, and
   wherein when the pinion pulley rotates in a direction opposite to the one direction, the upper column rectilinearly moves in a direction opposite to the first direction.

8. The steering column of claim 1, wherein when a rotary shaft of the telemotor is rotated by an operation of the telemotor, the pinion pulley is rotated by the belt.

9. The steering column of claim 1, wherein the belt connects a rotary shaft of the telemotor and a pulley gear of the pinion pulley.

10. The steering column of claim 1, wherein a lateral surface of the guide roller is in contact with the other side surface of the rack bar.

11. The steering column of claim 1, wherein the guide roller is disposed to face the pinion pulley based on an opening portion of the lower column or the rack bar.

* * * * *